J. K. KENDRICK.
VEHICLE BRAKE.
APPLICATION FILED FEB. 5, 1908.
901,451.
Patented Oct. 20, 1908.
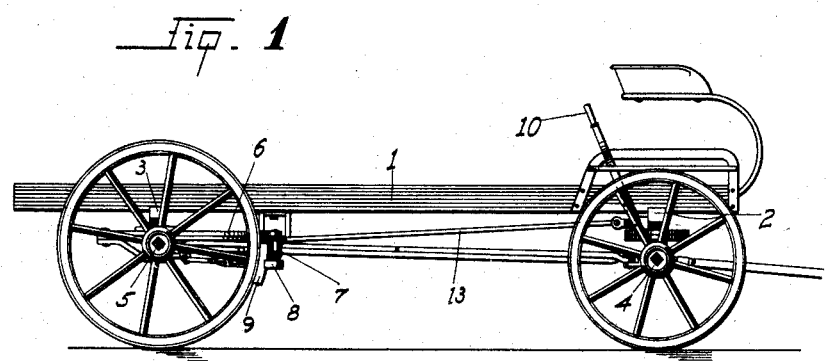
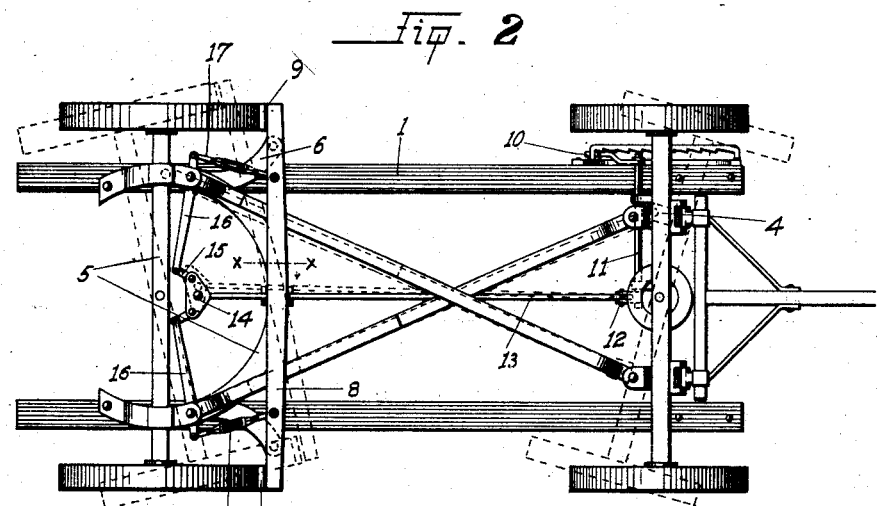
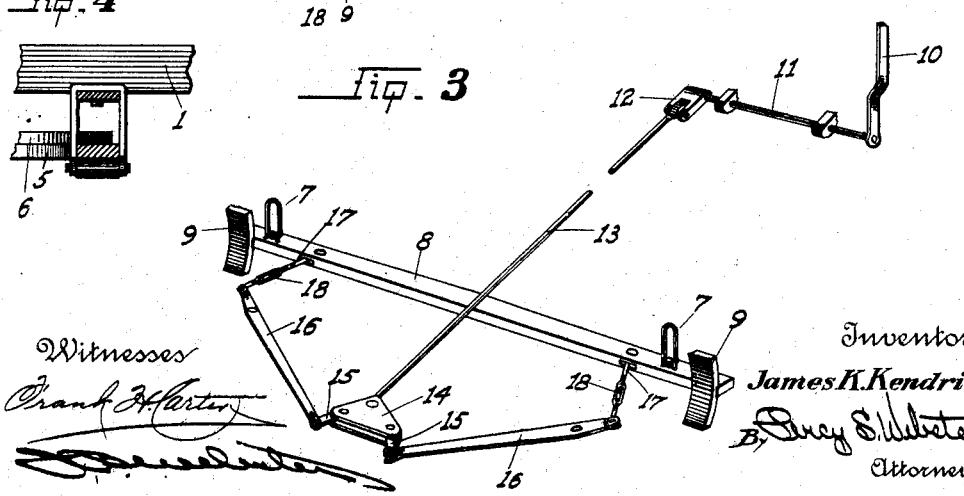
Witnesses
Inventor
James K. Kendrick
Attorney
THE NORRIS PETERS CO., WASHINGTON, D. C.

UNITED STATES PATENT OFFICE.

JAMES K. KENDRICK, OF GERMANTOWN, CALIFORNIA.

VEHICLE-BRAKE.

No. 901,451.          Specification of Letters Patent.          Patented Oct. 20, 1908.

Application filed February 5, 1908. Serial No. 414,332.

*To all whom it may concern:*

Be it known that I, JAMES K. KENDRICK, a citizen of the United States, residing at Germantown, in the county of Glenn and State of California, have invented certain new and useful Improvements in Vehicle-Brakes; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in vehicles and particularly to the brakes thereon, the object of the invention being to produce such a brake as will be compact and out of the way on the vehicle and one which will have a great braking power. Also one having a simplicity of construction and one which will operate on a freely turnable wheel truck and lose none of its effectiveness. These objects I accomplish by means of a freely flexible brake having its rod disposed beneath the vehicle, which is accomplished by means of the construction and relative arrangement of parts as will appear by a perusal of the following specification and claims.

In the drawings similar characters of reference indicate corresponding parts in the several views.

Figure 1 is a side elevation of the complete vehicle. Fig. 2 is a bottom plan view of a vehicle showing my improved brake installed thereon. Fig. 3 is a perspective view of my improved brake mechanism. Fig. 4 is a fragmentary view of a supporting roller mechanism.

Referring more particularly to the characters of reference on the drawings 1 designates the bed of a wagon and 2 the front supporting bolster thereof and 3 the rear supporting bolster.

4 designates the front wheel truck turnably connected with the bolster 2 and 5 is the rear wheel trucks turnably connected with the bolster 3.

6 are arms secured to the truck 5 and extending forward from which are hung flexible pins or chains 7 carrying a brake beam 8 having the usual shoes 9.

10 designates the brake lever suitably fulcrumed near the seat of the vehicle and provided with a transverse rod 11 extending to the center line of the under side of said wagon and carrying a pivot jaw member 12 carrying the brake rod 13, the rear end of said rod 13 being connected to the apex of a triangular plate 14. Links 15 connect the other ends of said plate 14 to levers 16 fulcrumed on the members 6, while links 17 connect the other ends of said levers 16 to the beam 8, said links 17 being provided with turn buckles 18 for the purpose of properly adjusting the position of the beam 8. When the brake is applied the system of levers and links as described give the braking power of the brake beam an enormous percentage as is apparent. Also by reason of the levers 16 and members 6 being secured to the turnable truck 5 and the flexible connections with the plate 14, the beam 8 and its parts turn freely with the said truck 5 and still loses none of its braking powers.

Another feature of advantage in my brake is that the brake rod 13 is out of the way under the bed of the wagon and not on the side as in most cases, which of course is in the way and a general nuisance.

From the foregoing description it will be seen that I have produced a brake which substantially fulfils all the objects of the invention as set forth herein.

While this specification sets forth in detail the present and preferred construction and relative arrangement of parts of my device, still in practice such deviations from such detail may be resorted to as do not form a departure from the spirit of the invention.

Having thus described my invention, what I claim as new and useful and desire to secure by Letters Patent is:—

A brake for vehicles comprising the combination of a wagon bed, a freely turnable front and rear wheel truck thereon, forwardly projecting arms disposed on said rear truck and being freely turnable therewith, a brake beam flexibly swung by chains from the ends of said arms, a brake lever secured on said wagon bed, a brake rod operatively connected at one end with said lever, a triangular plate pivotally secured at its apex to the other end of said rod, levers fulcrumed on said projecting arms, links pivotally connected with the corners of said plate and with said levers, links connected with said levers and said brake beam, and turn-buckles in said last named links, as set forth.

In testimony whereof I affix my signature in presence of two witnesses.

JAMES K. KENDRICK.

Witnesses:
PERCY S. WEBSTER,
FRANK H. CARTER.